March 5, 1946.    W. A. CUSTER    2,395,852
AIRCRAFT CABIN AND COMPARTMENT FOR HIGH ALTITUDE OPERATION
Filed April 5, 1943    2 Sheets-Sheet 1

INVENTOR.
WARREN ANDERSON CUSTER
BY
ATTORNEYS

March 5, 1946. W. A. CUSTER 2,395,852
AIRCRAFT CABIN AND COMPARTMENT FOR HIGH ALTITUDE OPERATION
Filed April 5, 1943 2 Sheets-Sheet 2

INVENTOR.
WARREN ANDERSON CUSTER
BY
ATTORNEYS

Patented Mar. 5, 1946

2,395,852

UNITED STATES PATENT OFFICE 2,395,852

AIRCRAFT CABIN AND COMPARTMENT FOR HIGH ALTITUDE OPERATION

Warren Anderson Custer, Newtown, Pa.

Application April 5, 1943, Serial No. 481,900

7 Claims. (Cl. 20—69)

This invention relates to the sealing of pressure cabins or compartments of aircraft for operation at high altitudes.

Difficulties are being experienced in the operation of aircraft at the high altitudes due to the lack of satisfactory methods and materials for sealing the pressure cabins and compartments for passengers and personnel of the operating force. The higher the craft rises into the substratosphere or stratosphere, the lower the temperature becomes until it reaches the assumed constant of around about minus 67° F. Also due to the decreasing atmospheric pressure as the craft ascends the differential in pressure between the pressure outside of the cabin and the pressure inside becomes larger as the altitude increases.

The temperature and pressure differentials between the interior of the cabin and the atmosphere outside of the cabin may vary over a wide range. For safe operation the cabin or compartment must be sealed against undue leakage between the interior and exterior thereof under the most extreme differences in pressures and temperatures arising in operation in order to preserve the oxygen supply, to maintain a living air pressure inside the cabin or compartment and to maintain livable temperatures inside the cabin or compartment. All closures and openings such as the doors, windows, hatches, emergency exits and openings through which controls and maneuverable objects, project must therefore be effectively and safely sealed under the most severe operating conditions.

One object of the invention is a novel and improved means and method for sealing or assisting in sealing the closures and openings of pressure cabins and compartments of aircraft for safe operation at the high altitudes.

A further object of the invention is a means and method for effecting the seal wherein the low outside temperatures and the differential in pressures between the inside and the outside of the cabin or compartment are utilized to assist in the maintenance of the seal and making the seal more effective.

From one aspect the invention resides in the utilization of a sealing material for the closures and openings of the cabin or compartment whose sealing capacity and effectiveness increase with the lower temperatures notwithstanding the higher differential pressures.

More particularly the means and method of this invention includes the use of a material about the closures which is fluid at ordinary room temperatures but whose viscosity increases at the lower temperatures encountered at the high altitudes and in a manner to more effectively seal the closures as the differential pressure increases. For example, a particularly suitable material utilized in the seal of this invention is one which can be introduced into a clearance or retaining chamber disposed about the closure to be sealed as an easily flowing fluid at normal or room temperatures but which upon being exposed to the temperature of the colder outside air at the higher altitudes congeals or tends to congeal to form a substantially solid but elastic and flexible seal against the interchange of air between the inside and outside.

A further object of the invention is a seal of the above described character comprising means operable at will to reduce or control the viscosity of the sealing material to impart to it the desired degree of fluidity and one means for effecting this purpose is a suitable electrical heating element or elements disposed in heating relation with the periphery of the closure and the sealing material thereabout.

In the preferred embodiment of the invention the sealing material which is a sealing fluid at ordinary or room temperatures is caused to flow while in the fluid condition around the boundary or peripheral edge of the closure, where it is retained to assist in maintaining a tight seal. This preferred material has the property as indicated, of an increase in viscosity with the lowering of the temperature so that upon exposure to the lower temperatures of the outside air experienced in plane operation in the stratosphere, and in a manner to act as an effective yieldable or flexible seal as soon as a differential in pressure exists between the inside and outside of the cabin or compartment. This differential in pressure tends to cause the fluid or semi-fluid sealing material to creep outwardly but such a difference in pressure is accompanied by very much lower temperatures on the outside with the result that the sealing fluid is influenced by the lower temperatures of the outside and thereby tends to become more viscous and better enabled to withstand the relatively high pressure in the fuselage, while the inner and less viscous portion of the sealing medium which is less affected by the outside temperature tends to be crowded into tight sealing relation under the influence of the pressure difference. The sealing fluid or material is disposed intermediate the inner and outer surfaces of the cabin wall and at a point where it is subjected to or influenced by the outside temperatures. The incorporation of heating means such as electrical heating means about the boundary or peripheral edges of the closures to be sealed enables the operator to render the sealing material sufficiently fluid readily to open the closure without difficulty, as for example in an emergency, upon landing, or for dropping bombs, in cases where the viscosity of the sealing material would not permit a ready opening of the closure.

Further objects of the invention will hereinafter appear.

For a better understanding of the invention reference may be had to the accompanying drawings showing embodiments thereof wherein.

Figure 2:
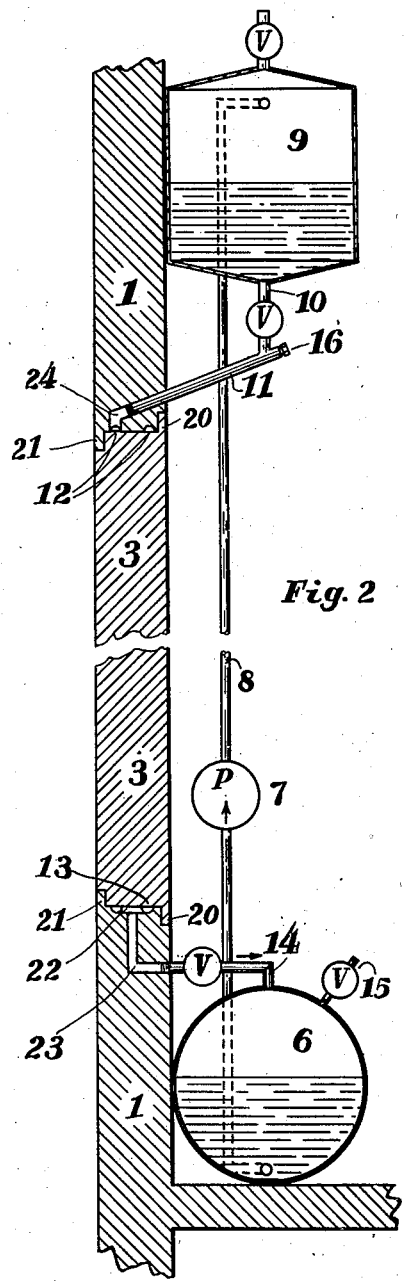
Fig. 2 is a section along the line 2—2 of Fig. 1.
Figure 1:
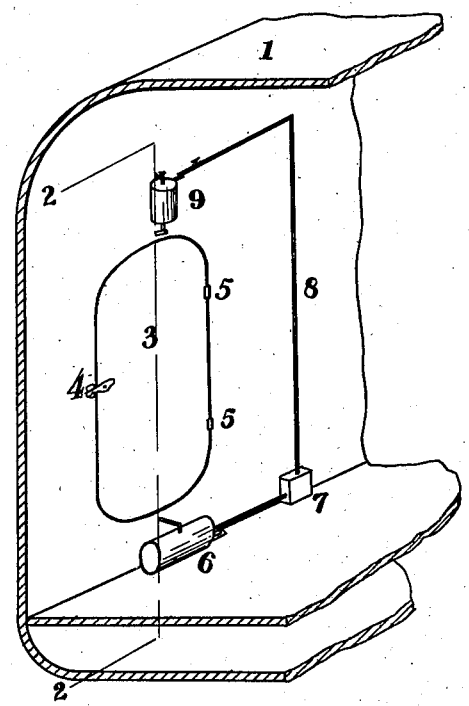
Fig. 1 is a perspective view of the interior of a part of a fuselage or airplane compartment embodying the invention.
Figure 3:
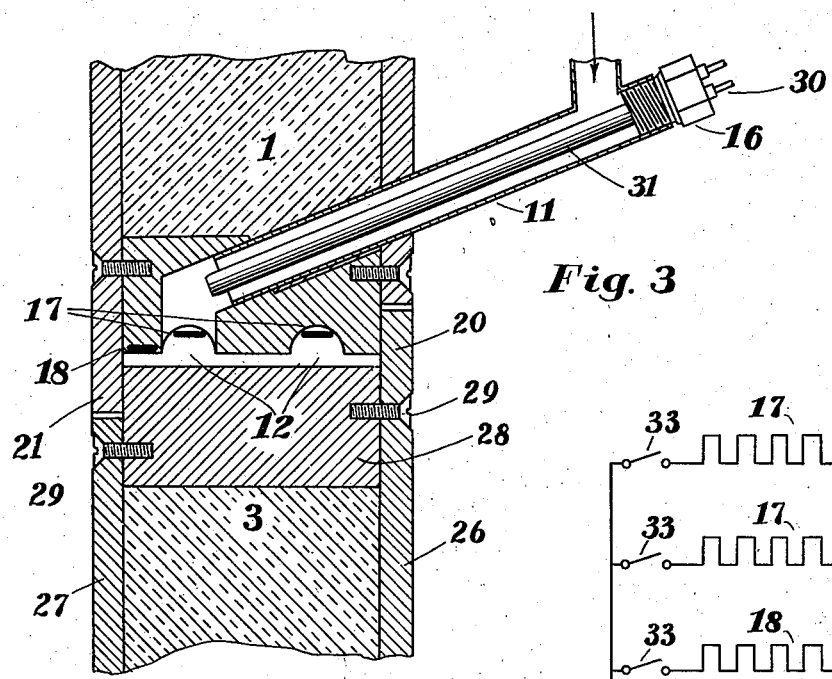
Fig. 3 is a sectional view on an enlarged scale.

Referring to Figs. 1–3, a section of the fuselage cabin or compartment of a high altitude craft, with the walls of the compartment diagrammatically indicated, is designated by the numeral 1. There opens into the compartment a door 3 which is hinged at the hinges 5—5 for inward swinging and opening movements. A suitable latch 4 is provided for locking the door in closed position. The sides and top edges of the wall forming the opening for the door which may be referred to as the door jamb, are formed on the interior with a recess preferably going all the way around the opening for the reception of a corresponding flange 20 formed about the interior edge of the door 3. Similarly, the door 3 is provided with a recess around its outer edge to accommodate a flange 21 formed on the door jamb. These recesses and corresponding flanges assist in forming a tight closure when the door 3 is closed.

The door and the door jamb are provided with means in addition to the tight fitting recesses and flanges above described for securing a tight closure under different altitude and temperature conditions. This comprises means on the door and the door jamb or on one of them for holding and retaining a special seal which is fluid at ordinary temperatures, and tends to become more viscous or less fluid at higher temperatures so as to assist in forming the seal, though its physical characteristics change with changes in temperature conditions such that it tends to become a solid, this sealing substance or material does not at any time impair or injure the structure. Any suitable material having the characteristics above described may be employed. A particularly suitable material is being marketed under the trade-name Thalube. This material has the physical property of being a fluid at ordinary or room temperatures, of becoming more viscous as the temperature is lowered and of congealing into an effective sealing material at temperatures encountered in the substratosphere or stratosphere. It also has the property as indicated, of being yielding and flexible when congealed so as not to injure the structure being sealed and of filling clearances or crevices between the surfaces to be sealed in an airtight manner against considerable differentials in pressure.

The viscosity of the material would vary somewhat depending upon the particular application of use. The pouring point may vary from slightly below zero Fahrenheit temperature to around minus 60° F. and by pouring point I mean the temperature below which the material will not flow, but as indicated above, the material even at those low temperatures still has some degree of pliability. It is understood that I am not limited to any specific formula or composition of a usable material for my purpose but the following are examples of materials having different viscosities which may be used in different applications:

*Example 1.*—To prepare a composition having a viscosity substantially the same as glycerin or a medium motor oil dissolve in 90 to 100 parts of dibutyl phthalate 0.9 to 1.0 parts of "wet" nitrocellulose (1000 second). Such cotton ordinarily contains approximately 30% solvent.

*Example 2.*—To illustrate the effect of the viscosity of the cotton on the viscosity of the final product a material which is substantially the same as that described in Example 1 may be prepared by dissolving 2 to 2.5 parts "wet" nitrocellulose (15 second) in 90 to 100 parts dibutyl phthalate.

*Example 3.*—A material having a viscosity at ordinary temperatures which approximates that of 600-W grease may be prepared by dissolving 4 to 6 parts of 100 second nitrocellulose in 90 to 100 parts of dibutyl phthalate.

*Example 4.*—A material having a viscosity approaching that of a thin cup grease may be made advantageously by dissolving 4 to 6 parts (1000 second) cotton in 90 to 100 parts of dibutyl phthalate.

*Example 5.*—To illustrate the manner of modifying the properties of the solution of the cotton in the cotton solvent one may employ a composition such as that formed by following the directions set forth in Examples 1 or 2. Upon heating 6.5 ounces of this composition to approximately 80° C. with 2 ounces of aluminum stearate and 12 ounces of toluol a clear jell is obtained of a consistency approximating Vaseline.

*Example 6.*—The composition set forth in Example 5 may be modified by omitting the cellulose ester from the dibutyl phthalate. The viscosity of the resulting product so prepared may likewise be varied by changing the proportions of the constituents and have properties which make them well suited for hydraulically operated devices of the general class hereinabove set forth.

However there are other fluids, lubricants and dissolved plastics known to those familiar to the art of lubrication and synthetic plastics that have similar characteristics and it is not the intention of the invention to limit the use of a sealing material.

A lubricant having a viscosity index of around 120 and a pour point of −20° F. may used and Thalube materials are particularly suitable due to the fact that they can be easily adapted to the mechanical and temperature requirements of the members of the cabin that are to be sealed.

For the purpose of accommodating and retaining this sealing substance one or both of the structural members is provided with a groove or grooves extending around the edge of the door and the door jamb, and in the particuar embodiment shown in Fig. 1, I have illustrated a pair of grooves 12 extending along the top mating edges of the door and the jamb.

These grooves 12 communicate at their ends with other grooves extending down the side walls of the door and jamb and the side grooves join with grooves or similar grooves on the bottom of the door and jamb. Preferably there are two grooves similar to 12 all around the closure which are spaced from each other some distance as indicated in Fig. 2 so as to provide two separate and spaced sealing grooves all the way around the door. If desired, single grooves only may be provided. Where the two grooves 12 extend all the way around the door jamb, an opening 22 represents a passage or clearance connecting the two separate grooves 12. With this passage or groove 22 connects a passage 23 formed in the wall of the compartment and leading through a pipe 14 to a container or reservoir 6 for the sealing material. A container 9 for the sealing fluid is illustrated to supply the fluid to the grooves formed in the upper edge of the door or jamb. Gravity may be utilized for supplying the fluid to the closure in which case as illustrated, the reservoir 9 is disposed above the level of the upper edge of the door. This reservoir communicates at the bottom through a pipe 10, 11 with a passage 24 formed in the wall above the closure and leading to the grooves 12.

The sealing fluid is initially contained in reservoir 9 and is supplied from there to the door and door jamb for sealing the same. From the door jamb the fluid passes through the pipe 14 to the reservoir 6. The fluid may be pumped up from the reservoir 6 to the reservoir 9 through the pipe 8, a pump 7 being illustrated for this purpose. The pipe 10 is provided with a suitable valve indicated by the letter V for shutting off the supply to the grooves. The pipe 14 is similarly provided with a valve to retain the sealing fluid in the door or door jamb. The reservoir 6 may be provided with any suitable pressure control valve 15.

The door is illustrated as shown in Fig. 3 as having side walls 26 and 27 which are spaced from each other by means of frame members 28, the side walls being fastened to the frame members 28 forming the periphery of the door in any suitable manner as for example by screw bolts 29. The door and other closures may be provided with any heat and cold insulating means between the side walls 26 and 27.

In Fig. 3 the grooves 12 are illustrated as being joined by a passage or by a clearance extending all the way across the width of the door frame 28.

Figure 4:
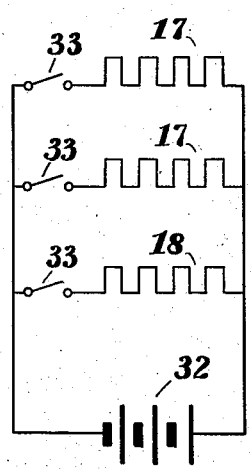
Fig. 4 is a view of a heating circuit diagram.

In Figs. 3 and 4 I have also illustrated a means for heating and rendering the congealed sealing material a fluid. This means comprises the electrical heating elements 17 disposed in the grooves 12. It is also of advantage to have an electrical heating element 18 embedded in the door jamb adjacent the outer-most groove 12 and the outer wall surface so as to facilitate the softening of the sealing material. These heating elements 17 and 18 preferably extend all the way around the door jamb.

I have also shown in Fig. 3 a means for supplying electric current to the heating coils 17 and 18. This means comprises a conventional electric plug 30 for connection with the source of current. This plug 30 is comprised in a nipple 16 which may be screw threadedly attached to the open end of the pipe 11 and preferably a pipe or tube 31 is carried by this nipple 16 for leading conductors, not shown, to the electric heating elements. In Fig. 4 I have shown a conventional battery 32 and circuits for supplying the heating elements 17 and 18. The heating coils 17 may be divided into two or more branches with switches 33 controlling these heaters and a similar switch 33 is shown for cutting in and out the heater 18.

Figure 5:
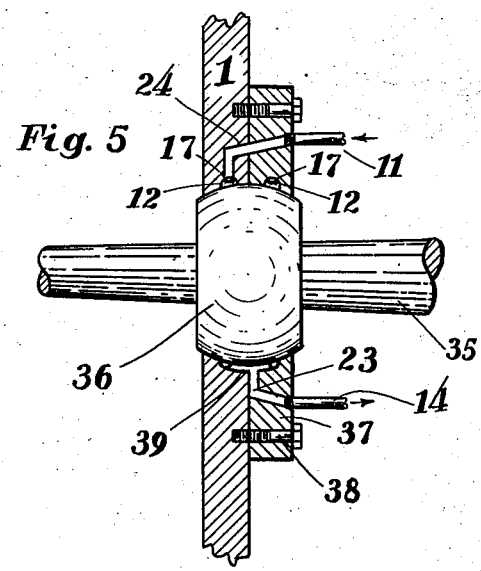
Fig. 5 is a view of an embodiment of the invention as applied to the sealing of closures for maneuverable objects such as guns.

In the embodiment of the invention in Fig. 5 I have shown the invention as applied to the sealing of the opening in the wall through which a maneuverable gun or other object projects, such as the object indicated at 35. This gun 35 is carried by a section 36 of a sphere which is mounted in a spherical surface formed in the opening in the wall 1 of the compartment. For facilitating the assembly a plate 37 is attached to the wall 1 and is fastened thereto by the screw bolts 38. A part of the spherical surface cooperating with the spherical member 36 is formed in the plate 37 and the member 36 is retained in the operative position with the maneuverable device 35 projecting out through the wall 1 and maneuverable universally to point in different directions. The spherical surfaces of the wall are provided with grooves 12 extending all the way around the spherical member 36 and are joined at the bottom by a passage 39 which in turn communicates with the passage 23 which leads to the outlet pipe 14. The sealing fluid is taken in through the pipe 11 and may be caused to flow all the way around the spherical member 36 to occupy the sealing grooves either by gravity or pump means. It is also preferable to have the grooves 12 joined by a passage or clearance intermediate the same at the top so as to provide for distribution from the top. It is understood that control valves are disposed in the pipes 11 and 14 for shutting off the supply of fluid and preventing the flow of fluid from the sealing grooves. Electric heater means such as 17 and 18 may be associated with the grooves and the sealing material therein to control its viscosity as in the modification of Figs. 1–4.

With members that protrude through the pressure cabin to the outer atmosphere it may also be desirable to use a sealing medium of a somewhat higher viscosity than that of the fluid used to seal those parts of the cabin that would ordinarily remain closed or immovable during flight in the stratosphere or substratosphere. For this purpose one could use a lubricant or material that would have a higher pour point say around −10° but one that would have a low rate of shear. The electrical resistance could be regulated so that it would heat the area which it contacts to a point above the pour point of the lubricant and thus accomplish a fluid seal. This type of adjustment in the sealing medium would be particularly adaptable to the uses in the universals used in swivel gun mountings (Fig. 5) or in the channels sealing revolving gun turrets or in the sealing of those operating openings from the cabin to the members of the aircraft external to the control cabin by which the controls are operated by mechanical motion from within the cabin.

A number of greases or lubricants known to those familiar to the art of lubrication could be employed in this application of the invention and the viscosity and viscosity index and rate of shear of the sealing medium to be used in any such instance would be determined by the mechanical, pressure and temperature conditions that would exist at the point and the action of the protruding member to be sealed.

I have illustrated and described above one specific method and means for heating and controlling the viscosity of the sealing material, namely an electric resistance heating means. It is understood that other heating means may be used such as heating by electric induction, by fluid contained heating elements, etc., and it is understood that the phase heating means used in the claims is intended to cover all alternative and suitable heating means for controlling the viscosity of the material except where specifically limited to resistance heaters.

In some applications of the invention as above indicated, it is advantageous to use as a sealing medium one that will not flow at the temperatures under which it is operated. However, in order to maintain an effective seal of the cabin it is desirable to introduce into the medium an electrical resistance or heating element so that a portion of this medium can be maintained in a fluid state in the areas surrounding the heating element so as to prevent by means of this fluid seal any leakage of air pressure from inside the cabin.

Thus by the correlation and use of a suitable heating means with sealing material coming within the scope of my invention and having a definite viscosity at one temperature, the viscosity of this sealing medium may be readily controlled and varied. In the embodiment of the invention shown in Fig. 5, it is preferable to use a material of a higher viscosity at a given temperature than that of the material best suited for the embodiment of Figs. 2 and 3, and since the rate of shear of the sealing medium utilized in Fig. 5 would in that case be lower than that of the preferred medium used in the embodiments of Figs. 2 and 3, it is advantageous to utilize the heating means such as the electric heating means 17 to maintain a portion of the sealing medium in a fluid state or semi-fluid state under operating conditions to effect sealing. Otherwise if the element were moved while the sealing medium was not in a fluid or semi-fluid condition, leakage might occur, since the sealing medium immediately adjacent the surface of the movable element would not flow to maintain the seal. In such cases it is particularly important to maintain the temperature of that part of the sealing medium which is in contact with the moving element above the pour point.

If desired, heaters may be disposed in or associated with the passages 23, 24 and the pipes 10, 11 and 14 to heat and facilitate the flow of the sealing medium therethrough. This applies not only to the embodiment of Fig. 5, but to all other cases where in the normal operating condition it is desired to maintain a tight seal notwithstanding the relative movements of the parts.

With the pressure cabin effectively sealed, as it is with my invention, the problem of air and atmosphere suitable for breathing becomes the same problem which is already solved in the cabins of submarines or similar craft.

I claim:

1. A seal for a closure member for an opening in a pressure cabin or compartment of an aircraft operable at high altitudes, comprising a groove about the closure and the opening and a sealing medium disposed in said groove which is a fluid at ordinary temperatures and has the property of becoming more highly viscous with decreasing temperatures over a wide temperature range from ordinary temperatures down to the low temperatures encountered at high altitudes and of congealing at the lower temperatures into a solid body which is yieldable and free from cracks and brittleness and remains so at the low temperatures encountered in the sub-stratosphere, said seal thereby offering increasing resistance to the increase of the differential of pressures on the outside and inside of the cabin or compartment as the craft ascends.

2. A seal for a closure member for an opening in a pressure cabin or compartment of an aircraft operable at high altitudes, comprising a groove about the closure and the opening and a sealing medium disposed in said groove which is a fluid at ordinary temperatures and has the property of becoming more highly viscous with decreasing temperatures over a wide temperature range from ordinary temperatures down to the low temperatures encountered at high altitudes and of congealing at the lower temperatures into a solid body which is yieldable and free from cracks and brittleness and remains so at the low temperatures encountered in the sub-stratosphere, said seal thereby offering increasing resistance to the increase of the differential of pressures on the outside and inside of the cabin or compartment as the craft ascends, the said sealing medium having a pouring point between 0° F. and —67° F.

3. A seal for a closure member for an opening in a pressure cabin or compartment of an aircraft operable at high altitudes, comprising a groove about the closure and the opening and a sealing medium disposed in said groove which is a fluid at ordinary temperatures and has the property of becoming more highly viscous with decreasing temperatures over a wide temperature range from ordinary temperatures down to the low temperatures encountered at high altitudes and of congealing at the lower temperatures into a solid body which is yieldable and free from cracks and brittleness and remains so at the low temperatures encountered in the sub-stratosphere, said seal thereby offering increasing resistance to the increase of the differential of pressures on the outside and inside of the cabin or compartment as the craft ascends, and heating means for controlling the viscosity of said sealing medium.

4. A pressure cabin or compartment for aircraft of the character set forth in claim 1 comprising electrical heating means for controlling the viscosity of said sealing medium.

5. A seal for a closure member for an opening in a pressure cabin or compartment of an aircraft operable at high altitudes, comprising a groove about the closure and the opening and a sealing medium disposed in said groove which is a fluid at ordinary temperatures and has the property of becoming more highly viscous with decreasing temperatures over a wide temperature range from ordinary temperatures down to the low temperatures encountered at high altitudes and of congealing at the lower temperatures into a solid body which is yieldable and free from cracks and brittleness and remains so at the low temperatures encountered in the sub-stratosphere, said seal thereby offering increasing resistance to the increase of the differential of pressures on the outside and inside of the cabin or compartment as the craft ascends, the said sealing medium comprising a high boiling point ester dissolved into a liquid solvent having a low freezing point.

6. A seal for a closure member for an opening in a pressure cabin or compartment of an aircraft operable at high altitudes, comprising a groove about the closure and the opening and a sealing medium disposed in said groove which is a fluid at ordinary temperatures and has the property of becoming more highly viscous with decreasing temperatures over a wide temperature range from ordinary temperatures down to the low temperatures encountered at high altitudes and of congealing at the lower temperatures into a solid body which is yieldable and free from cracks and brittleness and remains so at the low temperatures encountered in the sub-stratosphere, said seal thereby offering increasing resistance to the increase of the differential of pressures on the outside and inside of the cabin or compartment as the craft ascends, the said sealing medium comprising a relatively small quantity of nitrocellulose dissolved into a relatively large quantity of dibutyl phthalate.

7. A seal for a closure member for an opening in a pressure cabin or compartment of an aircraft operable at high altitudes, comprising a groove about the closure and the opening and a sealing medium disposed in said groove which is a fluid at ordinary temperatures and has the property of becoming more highly viscous with decreasing temperatures over a wide temperature range from ordinary temperatures down to the low temperatures encountered at high altitudes and of congealing at the lower temperatures into a solid body which is yieldable and free from cracks and brittleness and remains so at the low temperatures encountered in the sub-stratosphere, said seal thereby offering increasing resistance to the increase of the differential of pressures on the outside and inside of the cabin or compartment as the craft ascends, and comprising spaced grooves containing said sealing medium.

WARREN ANDERSON CUSTER.